(12) United States Patent
Park et al.

(10) Patent No.: US 12,032,824 B2
(45) Date of Patent: Jul. 9, 2024

(54) EVENT LOG MANAGEMENT METHOD, CONTROLLER AND STORAGE DEVICE

(71) Applicant: SK hynix Inc., Icheon-si (KR)

(72) Inventors: Do Geon Park, Icheon-si (KR); Soong Sun Shin, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 78 days.

(21) Appl. No.: 17/806,237

(22) Filed: Jun. 9, 2022

(65) Prior Publication Data

US 2023/0075820 A1 Mar. 9, 2023

(30) Foreign Application Priority Data

Sep. 9, 2021 (KR) .......................... 10-2021-0120354

(51) Int. Cl.
*G06F 3/06* (2006.01)
(52) U.S. Cl.
CPC .......... *G06F 3/0604* (2013.01); *G06F 3/0656* (2013.01); *G06F 3/0679* (2013.01)
(58) Field of Classification Search
CPC ..... G06F 3/0604; G06F 3/0656; G06F 3/0679
USPC ....................................................... 711/154
See application file for complete search history.

(56) References Cited

U.S. PATENT DOCUMENTS

| 5,966,708 | A | * | 10/1999 | Clark | G06F 16/2358 |
| 9,632,932 | B1 | * | 4/2017 | Sutardja | G06F 3/064 |
| 2007/0038799 | A1 | * | 2/2007 | Hummel | G06F 12/145 711/3 |
| 2015/0112935 | A1 | * | 4/2015 | French | G06F 16/11 707/822 |
| 2019/0129774 | A1 | * | 5/2019 | Konan | G06F 11/0778 |
| 2020/0004431 | A1 | * | 1/2020 | Chiang | G06F 3/0653 |
| 2020/0092391 | A1 | * | 3/2020 | Poydence | H04L 67/5682 |
| 2020/0226093 | A1 | * | 7/2020 | Butcher | G06F 9/5038 |
| 2022/0058161 | A1 | * | 2/2022 | Wang | G06F 16/188 |

FOREIGN PATENT DOCUMENTS

| KR | 20170132483 A | 12/2017 |
| KR | 20190022600 A | 3/2019 |

* cited by examiner

*Primary Examiner* — Christopher B Shin
(74) *Attorney, Agent, or Firm* — Weaver Austin Villeneuve & Sampson LLP (57) ABSTRACT

An event log management technique may include determining a new event associated with a storage device has occurred, determining a new event log can be stored in an event log chunk stored in an event log buffer, and deleting a number of old event logs starting from an oldest event log among old event logs of the event log chunk stored in the event log buffer if the new event log can be stored in the event log chunk stored in the event log buffer. The number of old event logs being deleted corresponds to a size of a new event log associated with the new event. The technique may also include storing the new event log starting at a start position of the oldest event log.

15 Claims, 11 Drawing Sheets

ELC(Event Log Chunk)

FIG. 6

ELCH(Event Log Chunk Header)

ELC(Event Log Chunk)

FIG. 8B

ELCH(Event Log Chunk Header)

EVENT LOG MANAGEMENT METHOD, CONTROLLER AND STORAGE DEVICE

CROSS-REFERENCES TO RELATED APPLICATION

The present application claims priority under 35 U.S.C. § 119(a) to Korean application number 10-2021-0120354, filed on Sep. 9, 2021, in the Korean Intellectual Property Office, which is incorporated herein by reference in its entirety.

BACKGROUND

1. Technical Field

Various embodiments generally relate to an electronic device and an operation method thereof, and more particularly, to an event log management method, a controller, and a storage device.

2. Related Art

Recently, the paradigm for the computing environment has changed to the ubiquitous computing environment in which computer systems can be used anytime anywhere. Therefore, the use of portable electronic devices such as mobile phones, digital cameras and notebook computers has rapidly increased. Such potable electronic devices generally have a data storage device that uses a memory device. The data storage device is used to store data which are used in the portable electronic devices.

Since a data storage device using a memory device may lack a mechanical driver, the data storage device has excellent stability and durability, high information access speed, and low power consumption. Examples of the data storage device having such advantages may include a USB (Universal Serial Bus) memory device, a memory card having various interfaces, a UFS (Universal Flash Storage) device, an SSD (Solid State Drive), etc.

SUMMARY

Various embodiments are directed to an event log management method, a controller, and a storage device, which can increase the available capacity of a memory.

Also, various embodiments are directed to an event log management method, a controller, and a storage device, which can minimize the number of old event logs which are lost when a new event occurs.

In an embodiment, an event log management method may include determining a new event associated with a storage device has occurred; determining a new event log can be stored in an event log chunk stored in an event log buffer; deleting a number of old event logs starting from an oldest event log among old event logs of the event log chunk stored in the event log buffer if the new event log can be stored in the event log chunk stored in the event log buffer, wherein the number of old event logs being deleted corresponds to a size of a new event log associated with the new event; and storing the new event log starting at a start position of the oldest event log.

In an embodiment, there is provided a controller having event log management circuitry coupled to an event log buffer, the event log circuitry operable to: determine a new event associated with a storage device has occurred; determine a new event log can be stored in an event log chunk stored in the event log buffer; delete a number of old event logs starting from an oldest event log among old event logs of the event log chunk stored in the event log buffer if the new event log can be stored in the event log chunk stored in the event log buffer, wherein the number of old event logs being deleted corresponds to a size of a new event log associated with the new event; and store the new event log starting at a start position of the oldest event.

In an embodiment, a storage device may include a non-volatile memory including an event log region; an event log buffer operable to store an event log chunk selected from a plurality of event log chunks stored in the event log region; and a controller operable to delete a number of old event logs starting from the oldest event log among old event logs of the event log chunk stored in the event log buffer, and store a new event log associated with a new event starting at the start position of the oldest event log. The number of old event logs being deleted may correspond to the size of the new event log.

In accordance with the present embodiments, as some event logs corresponding to the unit size of a read/write operation of a non-volatile memory, among all event logs, are buffered in the memory, the size of an area within the memory, required for buffering the event logs, may be reduced, which makes it possible to increase the available capacity of the memory to store other data.

Furthermore, when a new event log occurs, a certain number of old event logs corresponding to the size of the new event log, among event logs of an event log chunk buffered in the memory, may be deleted, and the new event log may be stored at the corresponding position, which makes it possible to minimize the number of old event logs which are lost when a new event occurs.

DETAILED DESCRIPTION

Hereafter, preferred embodiments will be described with reference to the accompanying drawings.

Figure 1:
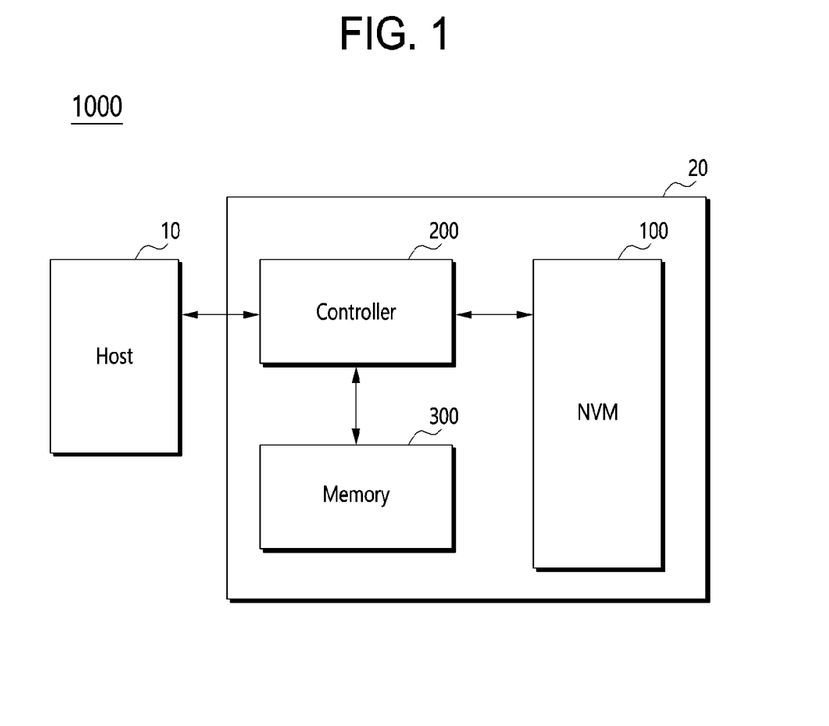
FIG. 1 is a diagram illustrating an example of a data processing system in accordance with an embodiment.

FIG. 1 is a diagram illustrating an example of a data processing system in accordance with an embodiment.

Referring to FIG. 1, a data processing system 1000 in accordance with an embodiment may include a host 10 and a storage device 20. Examples of the host 10 may include a mobile phone, MP3 player, laptop computer, desktop computer, game machine, TV, in-vehicle infotainment system and the like.

The host 10 may include one or more OSs (Operating Systems). The OS may manage and control overall functions and operations of the host 10. Furthermore, the OS may provide an interactive operation between the host 10 and a user who uses the data processing system 1000 or the storage device 20. The OS may support a function and operation corresponding to the purpose of use of a user. For example, the OS may be divided into a general OS and a mobile OS depending on the mobility of the host 10. Furthermore, the general OS may be divided into a personal OS and an enterprise OS, according to a user's usage environment. For example, the personal OS can be an OS that supports a service providing function for general users, and examples thereof may include Windows, Chrome, and the like. The enterprise OS can be an OS that provides security and supports high performance, and examples thereof may include Windows Server, Linux, Unix, and the like.

Furthermore, the mobile OS can be an OS that supports a mobile service providing function and a system power saving function for users, and examples thereof may include Android, iOS, Windows Mobile and the like. The host 10 may include a plurality of OSs.

Although not illustrated in FIG. 1, the host 10 may include a host controller and a host memory. The host controller may be operable to execute the OS to control overall operations of the host 10. The host controller may include one or more CPUs (Central Processing Units).

The host memory may be operable to temporarily store a command, data and the like, which are to be transmitted to the storage device 20 from the host 10. Furthermore, the host memory may be operable to temporarily store a response, data and the like, which are received from the storage device 20. The host memory may be a RAM (Random Access Memory) such as DRAM (Dynamic RAM) or SRAM (Static RAM), but the type of the host memory is not specifically limited thereto.

The storage device 20 may store data accessed by the host 10. The storage device 20 may be referred to as a data storage device or memory system.

The storage device 20 may be operable as any one of various types of storage devices, according to an interface protocol coupled to the host 10. For example, the storage device 20 may be operable as any one of various types of storage devices which include an SSD (Solid State Drive), an MMC (Multi-Media Card) such as an eMMC, RS-MMC or micro-MMC, an SD (Secure Digital) card such as a mini-SD or micro-SD, a USB (Universal Serial Bus) storage device, a UFS (Universal Flash Storage) device, a PCMCIA (Personal Computer Memory Card International Association) card-type storage device, a PCI (Peripheral Component Interconnection) card-type storage device, a PCI-E (PCI Express) card-type storage device, a CF (Compact Flash) card, a smart media card, a memory stick, etc.

The storage device 20 may be fabricated as any one of various types of packages. For example, the storage device 20 may be fabricated as any one of various types of packages such as a POP (Package-On-Package), SIP (System-In-Package), SOC (System-On-Chip), MCP (Multi-Chip Package), COB (Chip-On-Board), WFP (Wafer-level Fabricated Package), WSP (Wafer-level Stack Package), etc.

The storage device 20 may include a non-volatile memory (NVM) 100, a controller 200 and a memory 300.

The non-volatile memory 100 may operate as a data storage medium of the storage device 20. The non-volatile memory 100 may be operable as any one of various types of non-volatile memories such as a NAND flash memory, NOR flash memory, FRAM (Ferroelectric Random Access Memory) using a ferroelectric capacitor, MRAM (Magnetic Random Access Memory) using a TMR (Tunneling Magneto-Resistive) layer, PRAM (Phase Change Random Access Memory) using chalcogenide alloys, ReRAM (Resistive Random Access Memory) using transition metal oxide, etc., depending on memory cells.

Although FIG. 1 illustrates the non-volatile memory 100 as one block, the non-volatile memory 100 may include a plurality of memory chips (or dies). The present embodiment may also be applied in the same manner to the storage device 20 including the non-volatile memory 100 composed of a plurality of memory chips.

The non-volatile memory 100 may include a memory cell array (not illustrated) having a plurality of memory cells arranged at the respective intersections between a plurality of bit lines (not illustrated) and a plurality of word lines (not illustrated). The memory cell array may include a plurality of memory blocks, and each of the memory blocks may include a plurality of pages.

For example, each of the memory cells of the memory cell array may be a single level cell (SLC) for storing 1-bit data, a multi-level cell (MLC) capable of storing 2-bit data, a triple level cell (TLC) capable of storing 3-bit data, a quad level cell (QLC) capable of storing 4-bit data, etc. The memory cell array may include one or more of the SLC, the MLC, the TLC, the QLC, etc. For example, the memory cell array may include memory cells with a two-dimensional horizontal structure or memory cells with a three-dimensional vertical structure.

The controller 200 may be operable to control overall operations of the storage device 20. The controller 200 may generate control signals for controlling the operation of the non-volatile memory 100 in response to a request received from the host 10, and provide the generated control signals to the non-volatile memory 100.

For example, the controller 200 may generate a control signal for reading an event log chunk from the non-volatile memory 100 in response to a log providing request received from the host 10, and provide the generated control signal to the non-volatile memory 100. The controller 200 may transmit the event log chunk read from the non-volatile memory 100 to the host 10.

Figure 2:
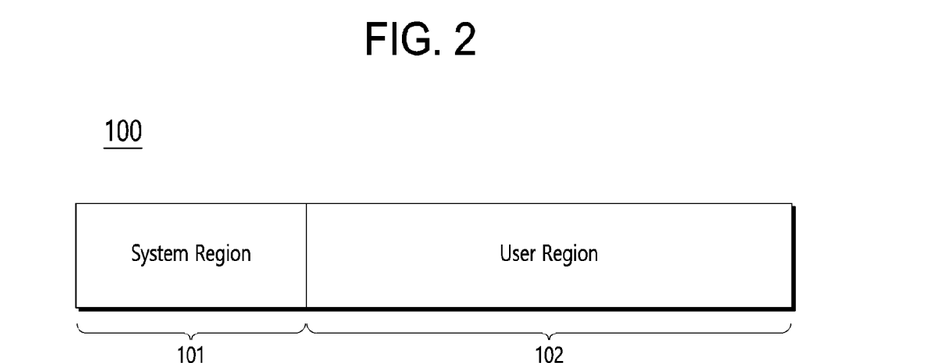
FIG. 2 is a diagram illustrating an example of the non-volatile memory of FIG. 1.

FIG. 2 is a diagram illustrating an example of the non-volatile memory of FIG. 1.

Referring to FIG. 2, the non-volatile memory 100 in accordance with the present embodiment may include a system region 101 and a user region 102.

The system region 101 of the non-volatile memory 100 may store various system data required for operations of the non-volatile memory 100. The system data may be required for driving firmware, and include data such as a map table and initialization information, operation bias information, operation timing information, bad block information, repair information, and operation state information of the non-volatile memory 100, etc. The system region 101 of the non-volatile memory 100 may be a region which is not typically accessed by the host 10.

The system region 101 of the non-volatile memory 100 may include a log region for storing a log. The log region may include an operation log region for storing information related to operations performed by the non-volatile memory 100, for example, read, write and erase operations, and an event log region 101ELR (see FIG. 3) for storing information related to an event which occurred in the storage device 20. However, the present embodiment is not limited thereto.

The event may indicate an operation situation (or operation state) of the storage device 20, which can be irrelevant to a request of the host 10. For example, an event may include reset, power cycle, time stamp change and hardware error of the storage device 20. However, the present embodiment is not limited thereto.

The user region 102 of the non-volatile memory 100 may store user data which is accessed by the host 10.

Figure 3:
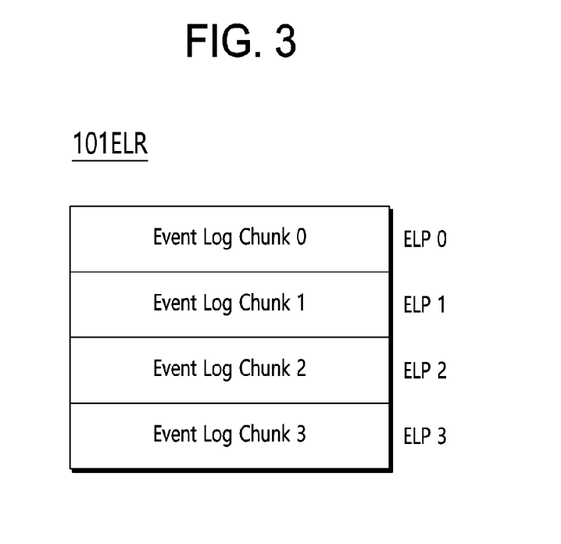
FIG. 3 is a diagram illustrating an example of a log region in accordance with an embodiment.

FIG. 3 is a diagram illustrating an example of an event log region in accordance with an embodiment.

Referring to FIG. 3, the event log region 101ELR in accordance with the present embodiment may include a plurality of event log pages ELP0 to ELP3. In other embodiments, event log region 101ELR may include a different number of event log pages ELP0 to ELP3. The plurality of event log pages ELP0 to ELP3 may store corresponding event log chunks Event Log Chunk 0 to 3, respectively. FIG. 3 illustrates that the plurality of event log pages ELP0 to ELP3 are sequentially listed. However, this is only an example for convenience of description, and the event log pages ELP0 to ELP3 may be logically sequential but physically non-sequential.

Although not illustrated in FIG. 3, the event log chunks Event Log Chunk 0 to 3 stored in the respective event log pages ELP0 to ELP3 may each include a plurality of event logs. The event log may also be referred to as an event log entry. For example, when a size of each of the event log pages ELP0 to ELP3 corresponds to the minimum unit size of a read/write operation on the non-volatile memory 100, the sizes of the respective event log chunks Event Log Chunk 0 to 3 may be equal to the minimum unit size of the read/write operation on the non-volatile memory 100.

The plurality of event log chunks Event Log Chunk 0 to 3 stored in the event log region 101ELR may be read and stored in the memory 300, under control of the controller 200. For example, the controller 200 may provide the non-volatile memory 100 with a log read control signal for one of the event log chunks Event Log Chunk 0 to 3, and the non-volatile memory 100 may provide the controller 200 with an event log chunk corresponding to the log read control signal provided from the controller 200. The controller 200 may store the event log chunk, provided from the non-volatile memory 100, in an event log buffer of the memory 300. In some embodiments, the event log chunks Event Log Chunk 0 to 3 stored in the event log region 101ELR can be read sequentially.

Figure 4:
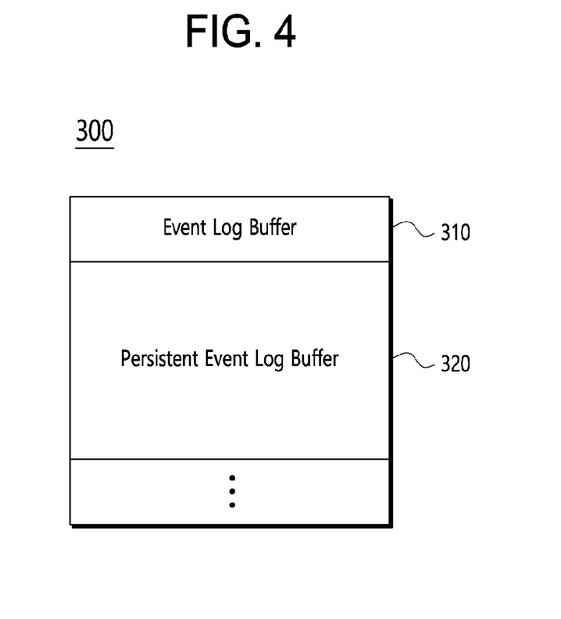
FIG. 4 is a diagram illustrating an example of the memory of FIG. 1.

FIG. 4 is a diagram illustrating an example of the memory of FIG. 1.

Referring to FIG. 4, the memory 300 in accordance with the present embodiment may include an event log buffer 310 and a persistent event log buffer 320. Although not illustrated in FIG. 4, the memory 300 may further include a FTL (Flash Translation Layer) region to which a FTL is loaded, a map data buffer to which map data is loaded, a write data buffer in which write data is temporarily stored, and a read data buffer in which read data is temporarily stored, etc.

The event log buffer 310 may store an event log chunk provided from the non-volatile memory 100. The size of the event log buffer 310 may be equal to the size of the event log chunk. For example, the size of the event log buffer 310 may be equal to the minimum unit size of a read/write operation of the non-volatile memory 100.

The controller 200 may update event logs (e.g. old event logs) of the event log chunk, stored in the event log buffer 310, with new event logs. The operation of updating the old event logs of the event log chunk with new event logs will be described in detail with reference to FIGS. 7A, 7B, 8A and 8B.

The persistent event log buffer 320 may store the event log chunks Event Log Chunk 0 to 3 which are stored in the event log pages ELP0 to ELP3 of the event log region 101ELR of the non-volatile memory 100. For example, when the host 10 transmits an event log request to the storage device 20, the controller 200 of the storage device 20 may generate the log read control signal for reading all of the event log chunks Event Log Chunk 0 to 3 from the event log region 101ELR of the non-volatile memory 100 in response to the event log request received from the host 10, and provide the generated log read control signal to the non-volatile memory 100.

The non-volatile memory 100 may read the event log chunks Event Log Chunk 0 to 3 from the event log region 101ELR according to the log read control signal provided from the controller 200, and provide the read event log chunks Event Log Chunk 0 to 3 to the controller 200. The controller 200 may store the event log chunks Event Log Chunk 0 to 3, provided from the non-volatile memory 100, in the persistent event log buffer 320 of the memory 300.

The persistent event log buffer 320 may be allocated for storing the event log chunks Event Log Chunk 0 to 3 in the memory 300 by the controller 200, when the event log request is received from the host 10. For example, when the event log request is received from the host 10, the controller 200 may allocate the persistent event log buffer 320 in the memory 300, and then provide the log read control signal to the non-volatile memory 100. Then, the controller 200 may transmit the event log chunks Event Log Chunk 0 to 3, stored in the persistent event log buffer 320, to the host 10. When the event log chunks Event Log Chunk 0 to 3 are completely transmitted, the controller 200 may deallocate the persistent event log buffer 320.

Figure 5:
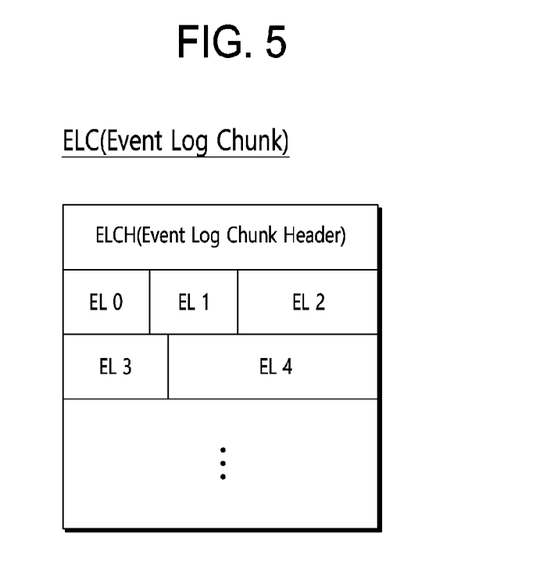
FIG. 5 is a diagram illustrating an example of an event log chunk in accordance with an embodiment.
Figure 6:
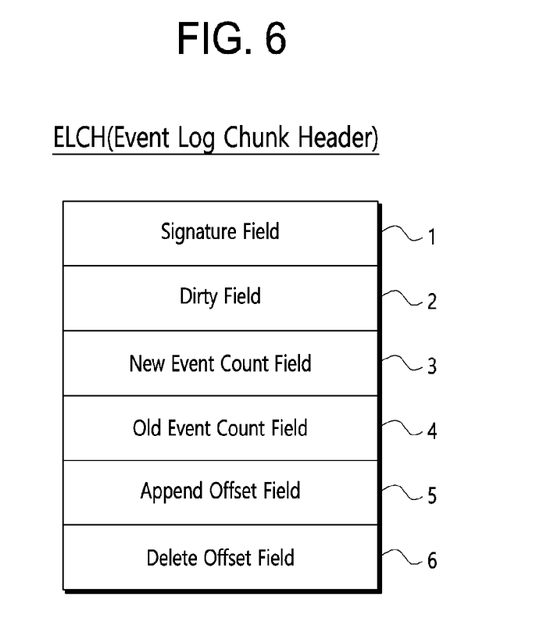
FIG. 6 is a diagram illustrating an example of a data structure of an event log chunk header of FIG. 5.

FIG. 5 is a diagram illustrating an example of an event log chunk in accordance with an embodiment, and FIG. 6 is a diagram illustrating an example of a data structure of an event log chunk header.

Referring to FIG. 5, an event log chunk ELC in accordance with the present embodiment may include an event log chunk header ELCH and a plurality of event logs EL 0 to 4. As shown in the example of FIG. 5, the plurality of event logs EL 0 to 4 can be stored in a contiguous manner.

In this manner, the available space in the event log chunk ELC can be maximized by storing the event logs adjacent to each other.

Referring to FIG. 6, the event log chunk header ELCH may include a signature field 1, a dirty field 2, a new event count field 3, an old event count field 4, an append offset field 5 and a delete offset field 6.

The signature field 1 may store a value indicating whether the corresponding event log chunk ELC is normal data. The dirty field 2 may store a value indicating whether there is an event log which has been changed after the corresponding event log chunk ELC was stored in the event log buffer 310 of the memory 300.

The new event count field 3 may store a value indicating the number of new event logs which are stored in the event log buffer 310 having the corresponding event log chunk ELC stored therein. The old event count field 4 may store a value indicating the number of old event logs included in the corresponding event log chunk ELC.

The append offset field 5 may store a value indicating a position within the event log buffer 310, where a new event log is to be stored. The delete offset field 6 may store a value indicating a position within the event log buffer 310, where an old event log, which is to be deleted in order to store a new event log, is stored. For example, the values stored in the fields 1 to 6 included in the event log chunk header ELCH may be changed by the controller 200.

Figure 7A:
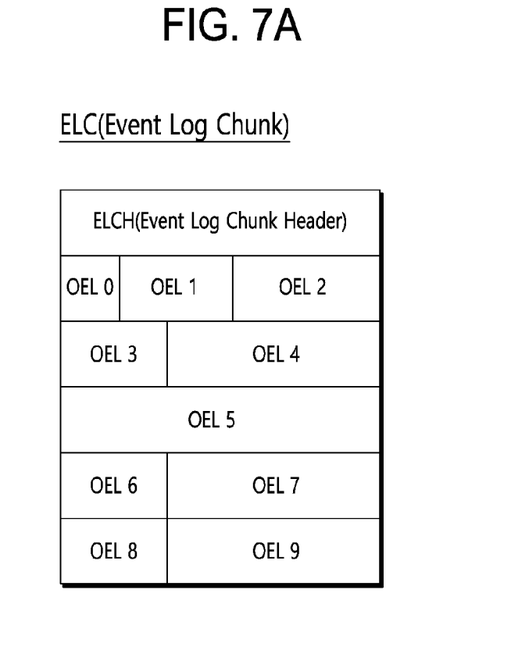
FIG. 7A is a diagram illustrating an example of an old event log chunk stored in an event log buffer in accordance with an embodiment.
Figure 7B:
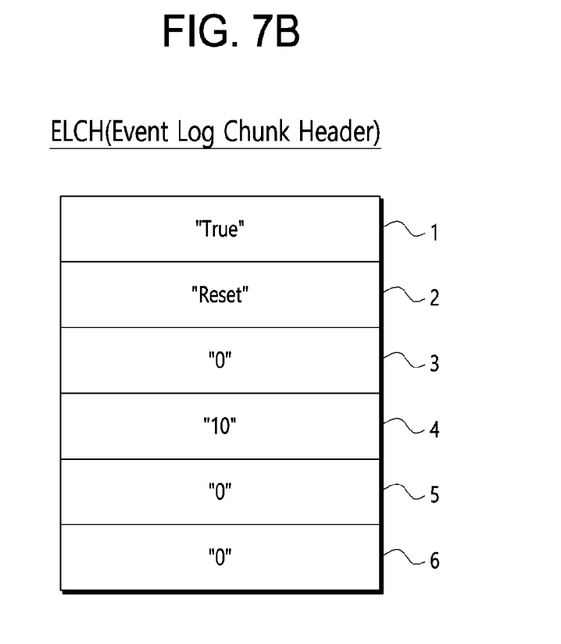
FIG. 7B is a diagram illustrating an example of a data structure of an event log chunk header of FIG. 7A.

FIG. 7A is a diagram illustrating an example of an old event log chunk stored in an event log buffer in accordance with an embodiment, and FIG. 7B is a diagram illustrating an example of a data structure of an event log chunk header of FIG. 7A.

Referring to FIG. 7A, the event log chunk ELC stored in the event log buffer 310 under control of the controller 200 includes 10 old event logs OEL 0 to OEL 9. For example, it is assumed that the size of the old event log OEL 0 is 10 Bytes, the size of the old event log OEL 1 is 20 Bytes, and the size of the old event log OEL 2 is 30 Bytes. Furthermore, it is assumed that the corresponding event log chunk ELC includes normal event logs.

Since the corresponding event log chunk ELC includes normal event logs, the controller 200 may store a value, indicating "True", in the signature field 1 of the event log chunk header ELCH, as illustrated in FIG. 7B. Furthermore, since no new event log occurred after the event log chunk ELC was stored in the event log buffer 310, the controller 200 may store a value indicating "Reset" in the dirty field 2 of the event log chunk header ELCH, and store a value indicating "0" in the new event count field 3.

Furthermore, since the corresponding event log chunk ELC includes 10 old event logs OEL 0 to OEL 9, the controller 200 may store a value indicating "10" in the old event count field 4 of the event log chunk header ELCH. Furthermore, since there are no new event log to be newly stored and no old event log to be deleted, the controller 200 may store a value indicating "0" in each of the append offset field 5 and the delete offset field 6 of the event log chunk header ELCH.

Figure 8A:
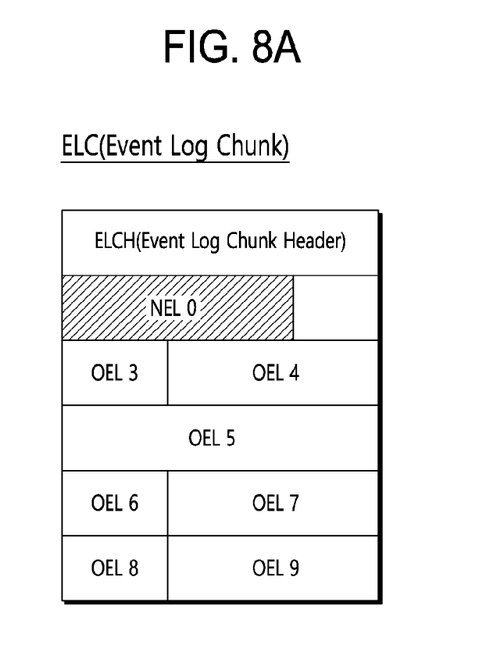
FIG. 8A is a diagram illustrating an example of an event log chunk in which some of old event logs are deleted and a new event log is stored, in accordance with an embodiment.
Figure 8B:
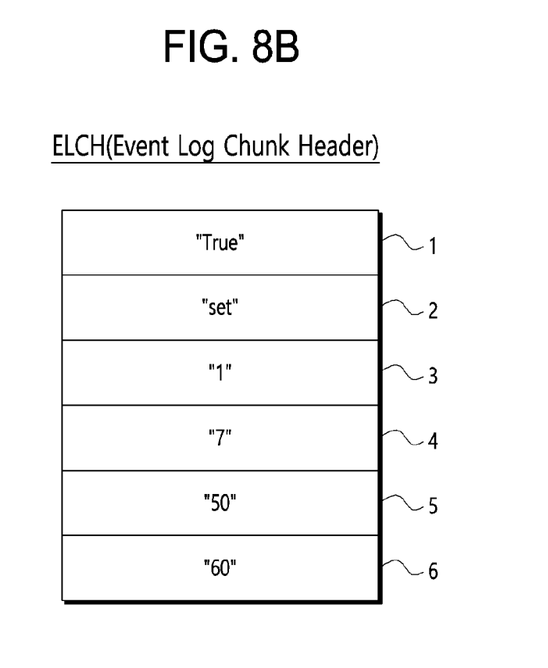
FIG. 8B is a diagram illustrating an example of a data structure of an event log chunk header of FIG. 8A.

FIG. 8A is a diagram illustrating an example of an event log chunk in which some of old event logs are deleted and a new event log is stored, in accordance with an embodiment, and FIG. 8B is a diagram illustrating an example of a data structure of an event log chunk header of FIG. 8A. For example, it is assumed that a new event log having a size of 50 Bytes occurred.

Referring to FIG. 8A, the controller 200 may delete a certain number of old event logs OEL 0 to OEL 2, corresponding to the size of a new event log NEL 0, from the oldest event log OEL 0 among the old event logs OEL 0 to OEL 9 of the event log chunk ELC stored in the event log buffer 310, and store the new event log NEL 0 in the event log chunk from the position corresponding to the value of "0", stored in the append offset field 5 of FIG. 7B. Thus, the values stored in the dirty field 2, the new event count field 3, the old event count field 4, the append offset field 5 and the delete offset field 6 among the fields 1 to 6 of the event log chunk header ELCH may be changed by the controller 200.

Referring to FIG. 8B, as a new event log NEL 0 occurs and is stored in the event log buffer 310, the value stored in the dirty field 2 of the event log chunk header ELCH may be changed to a value indicating "Set", and the value stored in the new event count field 3 of the event log chunk header ELCH may be changed to a value indicating "1". Furthermore, as three old event logs OEL 0 to OEL 2 are deleted to store the new event log NEL 0, the value stored in the old event count field 4 may be changed to a value indicating "7".

Furthermore, as the three old event logs OEL 0 to OEL 2 having a total size of 60 Bytes are deleted and the new event log NEL 0 having a size of 50 Bytes is stored at the corresponding position, the start position from which a new event log (e.g. NEL 1) to occur afterwards will be stored, i.e. the value of the append offset field 5, may be changed to "50", and the start position of an old event log (e.g. OEL 3) to be deleted afterwards, i.e. the value of the delete offset field 6, may be changed to "60".

Figure 9:
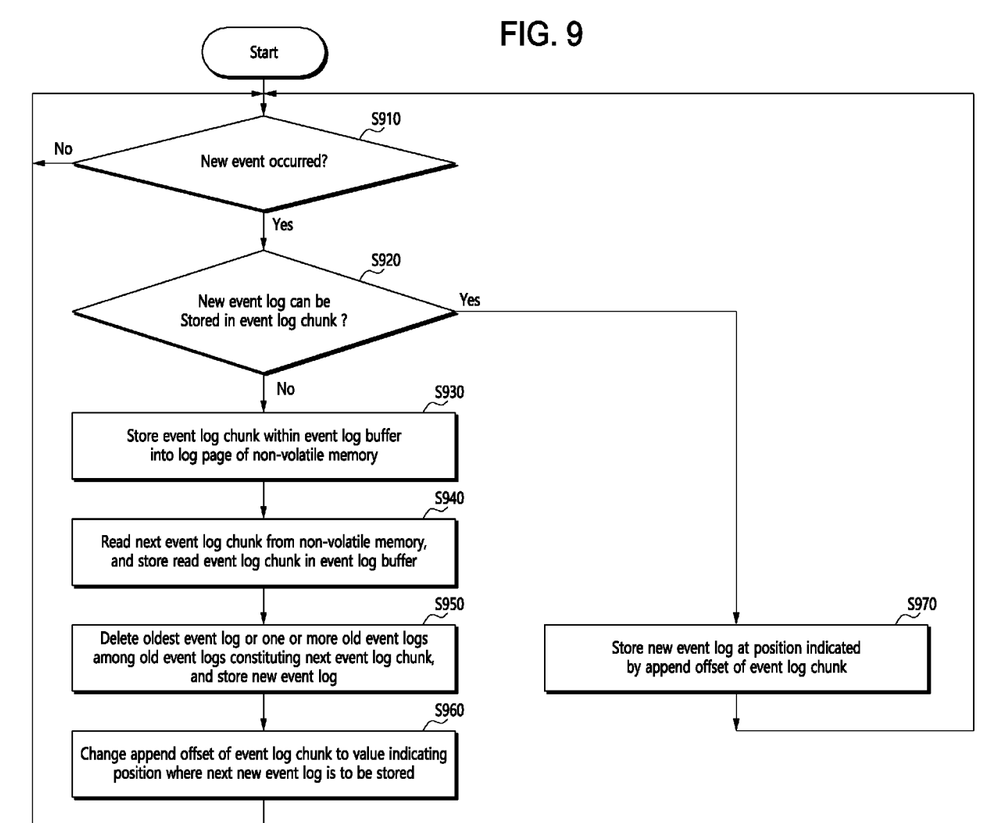
FIG. 9 is a flowchart illustrating an example of an event log management method in accordance with an embodiment.

FIG. 9 is a flowchart illustrating an example of an event log management method in accordance with an embodiment. When the event log management method in accordance with the present embodiment is described with reference to FIG. 9, reference may be made to one or more drawings of FIGS. 1 to 8B. For example, it is assumed that one event log chunk ELC is stored in the event log buffer 310 of the memory 300. The event log management method of FIG. 9 can be performed, for example, by event log management circuitry of a controller such as controller 200.

In step S910, the controller 200 may determine whether a new event occurred. For example, the controller 200 may determine whether an event such as reset, power cycle, time stamp change, hardware error, or the like has occurred. When it is determined that a new event occurred, the process may proceed to step S920.

In step S920, the controller 200 may determine whether the new event log can be stored in the event log chunk ELC loaded in the event log buffer 310. In an embodiment, the controller 200 may determine whether the sum of the size of the new event log and an append offset for the event log chunk ELC stored in the event log buffer 310 of the memory 300 is larger than a threshold value. For example, the threshold value may be equal to or smaller than the minimum unit size of a read/write operation of the non-volatile memory 100. For instance, the threshold value may be equal to a value obtained by subtracting the size of the header of the event log chunk ELC stored in the event log buffer 310 from the minimum unit size of the read/write operation of the non-volatile memory 100. When it is determined that the sum of the append offset and the size of the new event log is larger than the threshold value, the process may proceed to step S930.

In step S930, the controller 200 may control the non-volatile memory 100 to store the event log chunk ELC within the event log buffer 310 into a log page of the event log region 101ELR of the non-volatile memory 100.

In step S940, the controller 200 may read the next event log chunk from the event log region 101ELR of the nonvolatile memory 100, and store the read event log chunk in the event log buffer 310 of the memory 300.

In step S950, the controller 200 may delete a certain number of old event logs corresponding to the size of the new event log from the oldest event log among the old event logs constituting the next event log chunk stored in the event log buffer 310, and store the new event log at the corresponding position. At this time, the sum of the sizes of the deleted old event logs may be equal to or larger than the size of the new event log.

In step S960, the controller 200 may change the append offset for the event log chunk within the event log buffer 310 to a value indicating the start position from which a new event log to occur next time will be stored.

When it is determined in step S920 that the sum of the append offset and the size of the new event log is equal to or smaller than the threshold value, the process may proceed to step S970. In step S970, the controller 200 may start storing the new event log at the position in the event log buffer 310 indicated by the append offset for the event log chunk.

Figure 10:
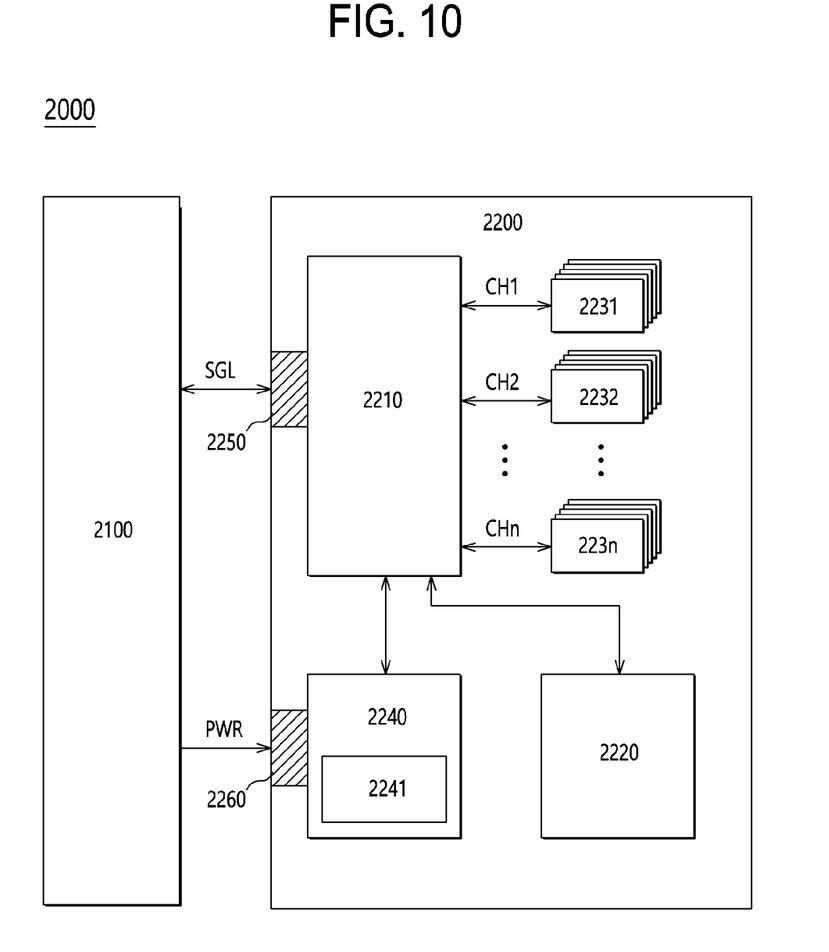
FIG. 10 is a diagram illustrating an example of a data processing system including a solid state drive (SSD) in accordance with an embodiment.

FIG. 10 is a diagram illustrating an example of a data processing system including a solid state drive (SSD) in accordance with an embodiment. Referring to FIG. 10, the data processing system 2000 may include a host 2100 and the SSD 2200.

The SSD 2200 may include a controller 2210, a buffer memory device 2220, nonvolatile memory devices 2231 to 223n, a power supply 2240, a signal connector 2250, and a power connector 2260.

The controller 2210 may control an overall operation of the SSD 2200. The controller 2210 may perform the functions described as being performed by the controller 200 of FIG. 1.

The buffer memory device 2220 may temporarily store data to be stored in the nonvolatile memory devices 2231 to 223n. The buffer memory device 2220 may temporarily store data read from the nonvolatile memory devices 2231 to 223n. The data temporarily stored in the buffer memory device 2220 may be transmitted to the host 2100 or the nonvolatile memory devices 2231 to 223n according to control of the controller 2210.

The nonvolatile memory devices 2231 to 223n may be used as a storage medium of the SSD 2200. The nonvolatile memory devices 2231 to 223n may be coupled to the controller 2210 through a plurality of channels CH1 to CHn. One or more nonvolatile memory devices may be coupled to one channel. The nonvolatile memory devices coupled to the one channel may be coupled to the same signal bus and the same data bus.

The power supply 2240 may provide power PWR input through the power connector 2260 to the inside of the SSD 2200. The power supply 2240 may include an auxiliary power supply 2241. The auxiliary power supply 2241 may supply the power so that the SSD 2200 is normally powered down even when sudden power-off occurs. The auxiliary power supply 2241 may include large capacity capacitors capable of charging the power PWR.

The controller 2210 may exchange a signal SGL with the host 2100 through the signal connector 2250. The signal SGL may include a command, an address, data, and the like. The signal connector 2250 may be operable of various types of connectors according to an interfacing method between the host 2100 and the SSD 2200.

Figure 11:
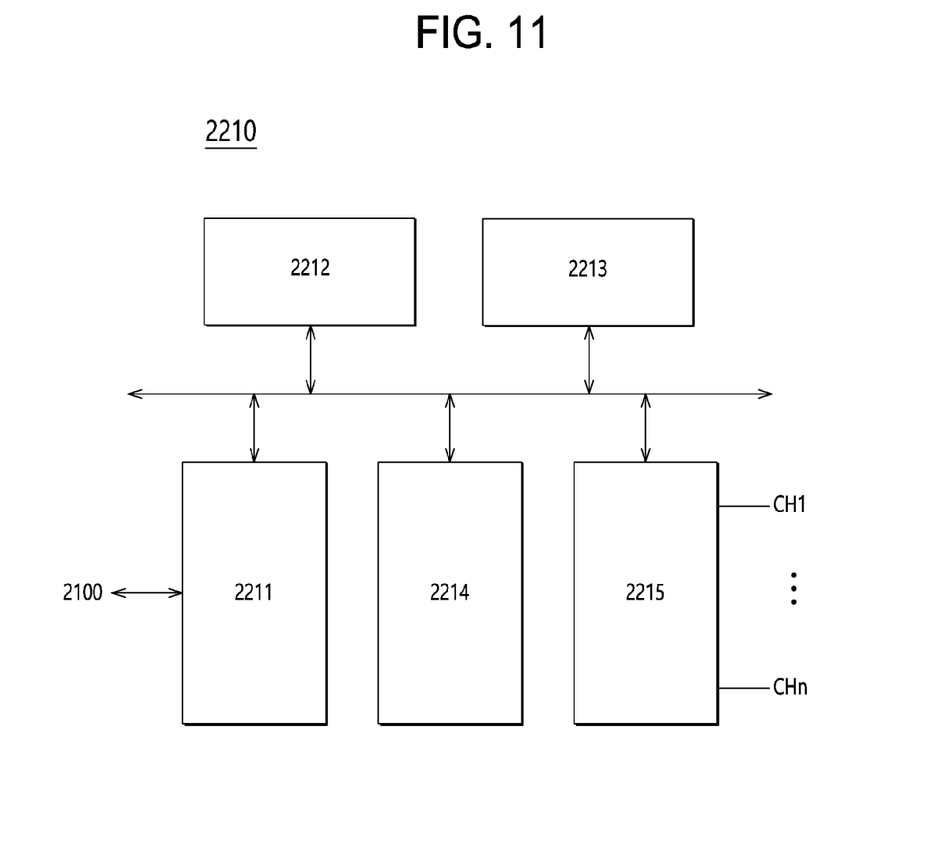
FIG. 11 is a diagram illustrating an example of a controller illustrated in FIG. 10.

FIG. 11 is a diagram illustrating an example of a controller illustrated in FIG. 10. Referring to FIG. 11, the controller 2210 may include a host interface unit 2211, a control unit 2212, a random access memory (RAM) 2213, an error correction code (ECC) unit 2214, and a memory interface unit 2215.

The host interface unit 2211 may perform interfacing between the host 2100 and the SSD 2200 according to a protocol of the host 2100. For example, the host interface unit 2211 may communicate with the host 2100 through any one of a secure digital protocol, a universal serial bus (USB) protocol, a multimedia card (MMC) protocol, an embedded MMC (eMMC) protocol, a personal computer memory card international association (PCMCIA) protocol, a parallel advanced technology attachment (PATA) protocol, a serial advanced technology attachment (SATA) protocol, a small computer system interface (SCSI) protocol, a serial attached SCSI (SAS) protocol, a peripheral component interconnection (PCI) protocol, a PCI Express (PCI-E) protocol, a universal flash storage (UFS) protocol, or the like. The host interface unit 2211 may perform a disc emulation function so that the host 2100 recognizes the SSD 2200 as a general-purpose data storage device such as, for example, a hard disc drive HDD.

The control unit 2212 may analyze and process the signal SGL input from the host 2100. The control unit 2212 may control operations of internal functional blocks according to firmware and/or software for driving the SDD 2200. The RAM 2213 may be operated as a working memory for driving the firmware or software.

The ECC unit 2214 may generate parity data for the data to be transferred to the nonvolatile memory devices 2231 to 223n. The generated parity data may be stored in the nonvolatile memory devices 2231 to 223n together with the data. The ECC unit 2214 may detect errors for data read from the nonvolatile memory devices 2231 to 223n based on the parity data. When detected errors are within a correctable range, the ECC unit 2214 may correct the detected errors.

The memory interface unit 2215 may provide a control signal such as a command and an address to the nonvolatile memory devices 2231 to 223n according to control of the control unit 2212. The memory interface unit 2215 may exchange data with the nonvolatile memory devices 2231 to 223n according to control of the control unit 2212. For example, the memory interface unit 2215 may provide data stored in the buffer memory device 2220 to the nonvolatile memory devices 2231 to 223n or provide data read from the nonvolatile memory devices 2231 to 223n to the buffer memory device 2220.

Figure 12:
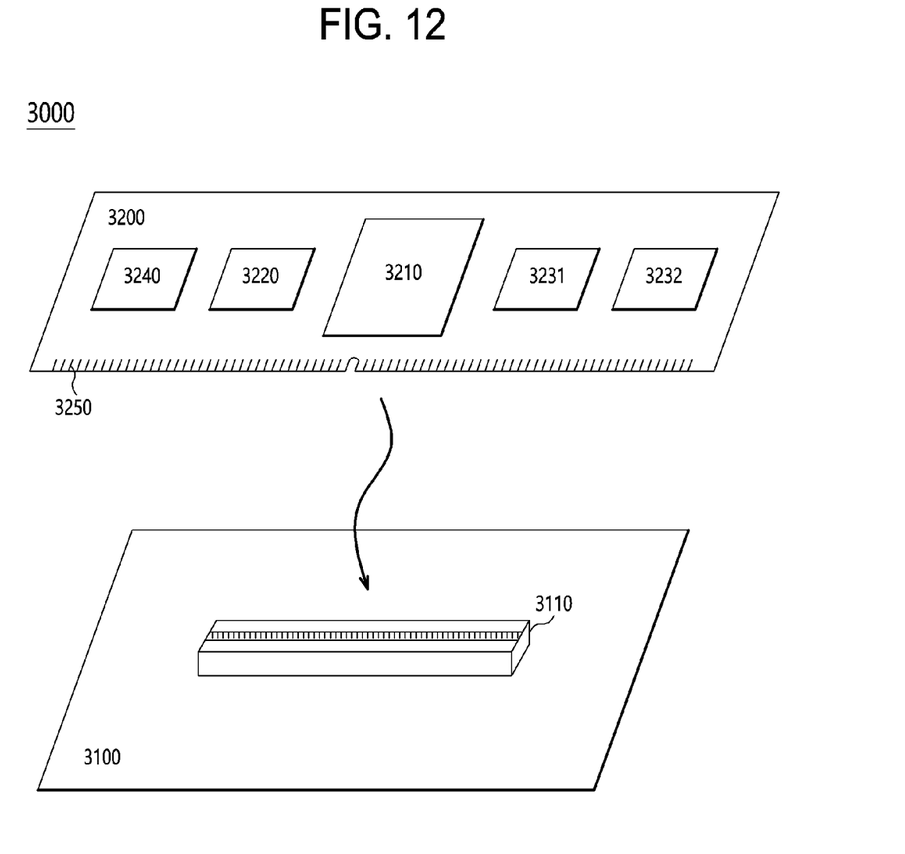
FIG. 12 is a diagram illustrating an example of a data processing system including a data storage device in accordance with an embodiment.

FIG. 12 is a diagram illustrating a data processing system including a data storage device in accordance with an embodiment. The data processing system 3000 may include a host 3100 and the data storage device 3200.

The host 3100 may be configured in a board form such as a printed circuit board (PCB). Although not shown in FIG. 12, the host 3100 may include internal functional blocks operable to perform functions of the host 3100.

The host 3100 may include a connection terminal 3110 such as a socket, a slot, or a connector. The data storage device 3200 may be mounted on the connection terminal 3110.

The data storage device 3200 may be configured in a board form such as a PCB. The data storage device 3200 may refer to a memory module or a memory card. The data storage device 3200 may include a controller 3210, a buffer memory device 3220, nonvolatile memory devices 3231 to 3232, a power management integrated circuit (PMIC) 3240, and a connection terminal 3250.

The controller 3210 may control an overall operation of the data storage device 3200. The controller 3210 may be operable to have the same configuration as the controller 2210 illustrated in FIG. 11.

The buffer memory device 3220 may temporarily store data to be stored in the nonvolatile memory devices 3231 and 3232. The buffer memory device 3220 may temporarily store data read from the nonvolatile memory devices 3231 and 3232. The data temporarily stored in the buffer memory device 3220 may be transmitted to the host 3100 or the nonvolatile memory devices 3231 and 3232 according to control of the controller 3210.

The nonvolatile memory devices 3231 and 3232 may be used as a storage medium of the data storage device 3200.

The PMIC 3240 may provide power input through the connection terminal 3250 to the inside of the data storage device 3200. The PMIC 3240 may manage the power of the data storage device 3200 according to control of the controller 3210.

The connection terminal 3250 may be coupled to the connection terminal 3110 of the host 3100. A signal such as a command, an address, and data and power may be transmitted between the host 3100 and the data storage device 3200 through the connection terminal 3250. The connection terminal 3250 may be configured in various forms according to an interfacing method between the host 3100 and the data storage device 3200. The connection terminal 3250 may be arranged in any one side of the data storage device 3200.

Figure 13:
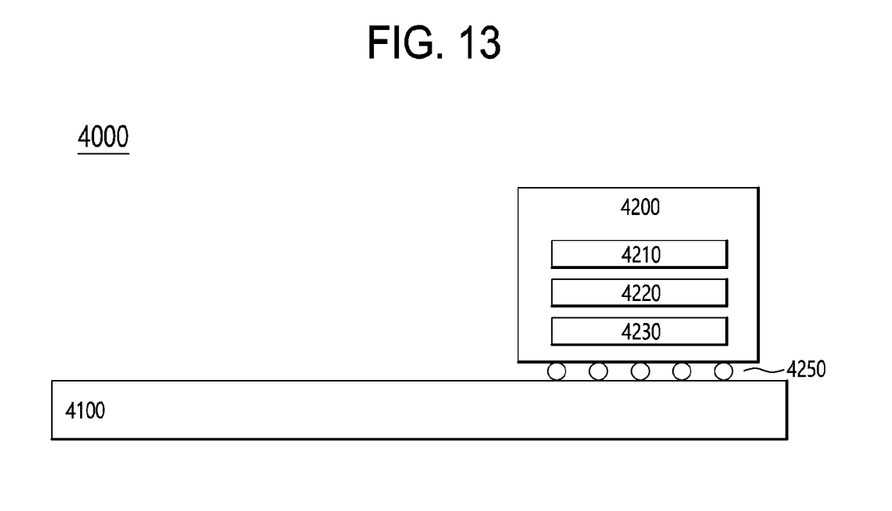
FIG. 13 is a diagram illustrating an example of a data processing system including a data storage device in accordance with an embodiment.

FIG. 13 is a diagram illustrating an example of a data processing system including a data storage device in accordance with an embodiment. Referring to FIG. 13, the data processing system 4000 may include a host 4100 and the data storage device 4200.

The host 4100 may be configured in a board form such as a PCB. Although not shown in FIG. 13, the host 4100 may include internal functional blocks operable to perform functions of the host 4100.

The data storage device 4200 may be configured in a surface mounting packaging form. The data storage device 4200 may be mounted on the host 4100 through a set of solder balls 4250. The data storage device 4200 may include a controller 4210, a buffer memory device 4220, and a nonvolatile memory device 4230.

The controller 4210 may control an overall operation of the data storage device 4200. The controller 4210 may be operable to have the same configuration as the controller 2210 illustrated in FIG. 11.

The buffer memory device 4220 may temporarily store data to be stored in the nonvolatile memory device 4230. The buffer memory device 4220 may temporarily store data read from the nonvolatile memory device 4230. The data temporarily stored in the buffer memory device 4220 may be transmitted to the host 4100 or the nonvolatile memory device 4230 through control of the controller 4210.

The nonvolatile memory device 4230 may be used as a storage medium of the data storage device 4200.

Figure 14:
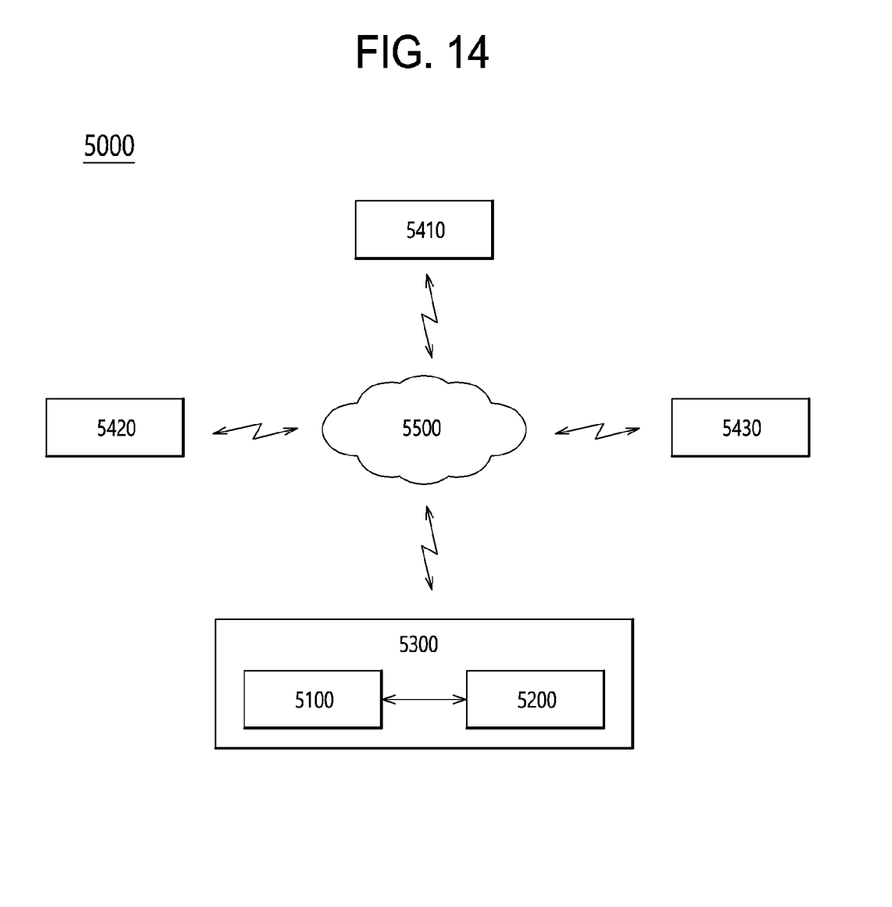
FIG. 14 is a diagram illustrating an example of a network system including a data storage device in accordance with an embodiment.

FIG. 14 is a diagram illustrating an example of a network system including a data storage device in accordance with an embodiment. Referring to FIG. 14, the network system 5000 may include a server system 5300 and a plurality of client systems 5410 to 5430 which are coupled through a network 5500.

The server system 5300 may serve data in response to requests of the plurality of client systems 5410 to 5430. For example, the server system 5300 may store data provided from the plurality of client systems 5410 to 5430. In another example, the server system 5300 may provide data to the plurality of client systems 5410 to 5430.

The server system 5300 may include a host 5100 and a data storage device 5200. The data storage device 5200 may be in the form of the storage device 1000 of FIG. 1, the SSD 2200 of FIG. 10, the data storage device 3200 of FIG. 12, or the data storage device 4200 of FIG. 13.

Figure 15:
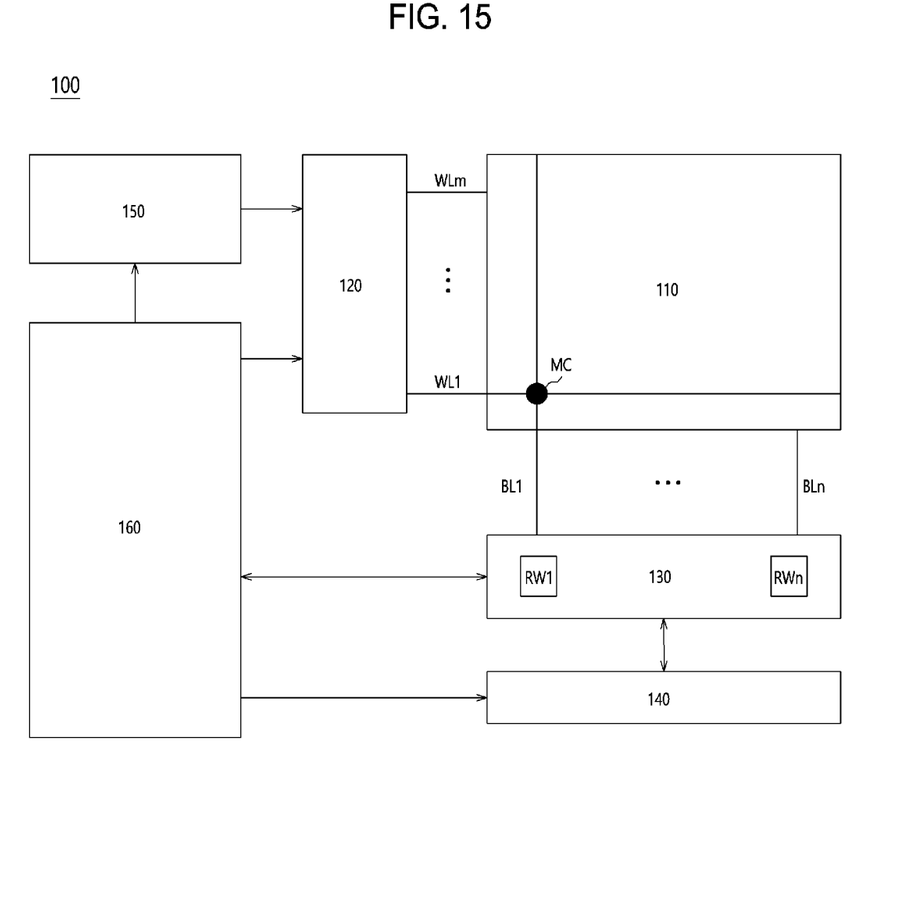
FIG. 15 is a diagram illustrating an example of a non-volatile memory device included in a storage device in accordance with an embodiment.

FIG. 15 is a diagram illustrating an example of a nonvolatile memory device included in a storage device in accordance with an embodiment. Referring to FIG. 15, a nonvolatile memory device 100 may include a memory cell array 110, a row decoder 120, a column decoder 140, a data read/write block 130, a voltage generator 150, and a control logic 160.

The memory cell array 110 may include memory cells MC arranged in regions in which word lines WL1 to WLm and bit lines BL1 to BLn cross with each other.

The row decoder 120 may be coupled to the memory cell array 110 through the word lines WL1 to WLm. The row decoder 120 may operate through control of the control logic 160. The row decoder 120 may decode an address provided from an external apparatus (not shown). The row decoder 120 may select and drive the word lines WL1 to WLm based on a decoding result. For example, the row decoder 120 may provide a word line voltage provided from the voltage generator 150 to the word lines WL1 to WLm.

The data read/write block 130 may be coupled to the memory cell array 110 through the bit lines BL1 to BLn. The data read/write block 130 may include read/write circuits RW1 to RWn corresponding to the bit lines BL1 to BLn. The data read/write block 130 may operate according to control of the control logic 160. The data read/write block 130 may operate as a write driver or a sense amplifier according to an operation mode. For example, the data read/write block 130 may operate as the write driver operable to store data provided from an external apparatus in the memory cell array 110 in a write operation. In another example, the data read/write block 130 may operate as the sense amplifier operable to read data from the memory cell array 110 in a read operation.

The column decoder 140 may operate though control of the control logic 160. The column decoder 140 may decode an address provided from an external apparatus (not shown). The column decoder 140 may couple the read/write circuits RW1 to RWn of the data read/write block 130 corresponding to the bit lines BL1 to BLn and data input/output (I/O) lines (or data I/O buffers) based on a decoding result.

The voltage generator 150 may generate voltages used for an internal operation of the nonvolatile memory device 100. The voltages generated through the voltage generator 150 may be applied to the memory cells of the memory cell array 110. For example, a program voltage generated in a program operation may be applied to word lines of memory cells in which the program operation is to be performed. In another example, an erase voltage generated in an erase operation may be applied to well regions of memory cells in which the erase operation is to be performed. In another example, a read voltage generated in a read operation may be applied to word lines of memory cells in which the read operation is to be performed.

The control logic 160 may control an overall operation of the nonvolatile memory device 100 based on a control signal provided from an external apparatus. For example, the control logic 160 may control an operation of the nonvolatile memory device 100 such as a read operation, a write operation, an erase operation of the nonvolatile memory device 100.

While various embodiments have been described above, it will be understood to those skilled in the art that the specific embodiments described are just examples. Accordingly, the event log management method, the controller and the storage device, which are described herein, should not be limited based on the described embodiments.

What is claimed is:

1. An event log management method comprising:
   determining, by a controller, a new event associated with a storage device has occurred;
   determining, by the controller, whether an event log associated with the new event can be stored in an event log chunk stored in an event log buffer, wherein the event log chunk comprises a header and a plurality of event logs, and wherein the header comprises an append offset field storing a value indicating where in the event log buffer a new event log is to be stored, and a delete offset field operable to store a value indicating where an oldest event log is stored in the event log buffer;
   deleting, by the controller, a number of old event logs starting from the oldest event log among old event logs of the event log chunk stored in the event log buffer to accommodate a size of the event log associated with the new event if the event log associated with the new event can be stored in the event log chunk stored in the event log buffer; and
   storing, by the controller, the event log associated with the new event starting at a start position indicated by the append offset field.

2. The event log management method according to claim 1, further comprising:
   determining whether a sum of the size of the event log associated with the new event and the value of the append offset field is larger than a threshold value, to determine whether the event log associated with the new event can be stored in the event log chunk stored in the event log buffer;
   storing the event log chunk within the event log buffer into a non-volatile memory, when the sum of the size of the new event log and the value of the append offset field is larger than the threshold value; and
   reading a next event log chunk from the non-volatile memory, and storing the read event log chunk in the event log buffer.

3. The event log management method according to claim 1, further comprising:
   updating the append offset field after storing the event log associated with the new event in the event log buffer.

4. A controller comprising:
   event log management circuitry coupled to an event log buffer, the event log management circuitry operable to:
   determine a new event associated with a storage device has occurred;
   determine whether an event log associated with the new event can be stored in an event log chunk stored in the event log buffer, wherein the event log chunk comprises a header and a plurality of event logs, and wherein the header comprises an append offset field storing a value indicating where in the event log buffer a new event log is to be stored, and a delete offset field operable to store a value indicating where an oldest event log is stored in the event log buffer;
   delete a number of old event logs starting from the oldest event log among old event logs of the event log chunk stored in the event log buffer to accommodate a size of the event log associated with the new event if the event log associated with the new event can be stored in the event log chunk stored in the event log buffer; and
   store the event log associated with the new event starting at a start position indicated by the append offset field.

5. The controller according to claim 4, wherein the controller is operable to update the value stored in the append offset field to a value increased by the size of the event log associated with the new event.

6. The controller according to claim 4, wherein the controller is operable to update the value stored in the delete offset field to a value increased by a sum of sizes of the deleted old event logs.

7. The controller according to claim 4, wherein the controller is operable to determine whether a sum of the size of the event log associated with the new event and the value of the append offset field is larger than a threshold value to determine whether the event log associated with the new event can be stored in the event log chunk stored in the event log buffer, and store the new event log in the event log buffer based on the determination result.

8. The controller according to claim 7, wherein when the sum of the size of the event log associated with the new event and the value of the append offset field is larger than the threshold value, the controller determines the event log associated with the new event cannot be stored in the event log chunk stored in the event log buffer, the controller stores the event log chunk within the event log buffer into a non-volatile memory, reads the next event log chunk from a non-volatile memory, and stores the read event log chunk in the event log buffer.

9. A storage device comprising:
   a non-volatile memory comprising an event log region;
   an event log buffer operable to store an event log chunk selected from a plurality of event log chunks stored in the event log region, wherein the event log chunk comprises a header and a plurality of event logs, and wherein the header comprises an append offset field storing a value indicating where in the event log buffer a new event log is to be stored, and a delete offset field operable to store a value indicating where an oldest event log is stored in the event log buffer; and
   a controller operable to delete a number of old event logs starting from an oldest event log among old event logs of the event log chunk stored in the event log buffer to accommodate a size of a event log associated with a new event, and wherein the controller is further operable to store the event log associated with the new event starting at a start position indicated by the append offset field.

10. The storage device according to claim 9, wherein the event log region comprises a plurality of event log pages for storing corresponding event log chunks, respectively.

11. The storage device according to claim 10, wherein the plurality of event log pages each have a size corresponding to a size of the event log buffer.

12. The storage device according to claim 10, wherein the controller is operable to sequentially read the event log chunks stored in the respective event log pages from the non-volatile memory, and store the read event log chunks in the event log buffer.

13. The storage device according to claim 9, wherein after storing the event log associated with the new event, the controller is operable to update the value stored in the append offset field to a value increased by the size of the event log associated with the new event, and update the value stored in the delete offset field to a value increased by a sum of the sizes of the deleted old event logs.

14. The storage device according to claim 9, wherein the controller is operable to determine whether a sum of the size of the new event log and the value of the append offset field is larger than a threshold value, and store the event log associated with the new event in the event log buffer based on the determination result.

15. The storage device according to claim 14, wherein when the sum of the size of the new event log and the value of the append offset field is larger than the threshold value, the controller determines the new event log cannot be stored in the event log chunk stored in the event log buffer, the controller stores the event log chunk within the event log buffer into a non-volatile memory, reads a next event log chunk from the non-volatile memory, and stores the read event log chunk in the event log buffer.

* * * * *